United States Patent [19]
Jeffers

[11] Patent Number: 4,754,354
[45] Date of Patent: Jun. 28, 1988

[54] FERRITE FILM INSULATING LAYER IN A YOKE-TYPE MAGNETO-RESISTIVE HEAD

[75] Inventor: Frederick J. Jeffers, Escondido, Calif.

[73] Assignee: Eastman Kodak Company, Rochester, N.Y.

[21] Appl. No.: 859,685

[22] Filed: May 5, 1986

[51] Int. Cl.$^4$ .......................... G11B 5/39; G11B 5/235
[52] U.S. Cl. ..................................... 360/113; 360/119
[58] Field of Search ................ 360/113, 119, 125, 126

[56] References Cited

U.S. PATENT DOCUMENTS

| | | | |
|---|---|---|---|
| 4,150,408 | 4/1979 | Koel et al. | 360/113 |
| 4,425,593 | 1/1984 | Postma | 360/113 |
| 4,477,319 | 10/1984 | Abe et al. | 204/56 R |
| 4,489,357 | 12/1984 | VanOoijen et al. | 360/113 |
| 4,613,918 | 9/1986 | Kanai et al. | 360/113 |

FOREIGN PATENT DOCUMENTS 60-50612  3/1985  Japan ..................................... 360/113

OTHER PUBLICATIONS

Masanori Abe, Yutaka Tamaura, *Ferrite Plating in Aqueous Solution: New Technique for Preparing Magnetic Thin Film*, J. Appl. Phys. 55(6); 3/15/84.

Primary Examiner—John H. Wolff
Assistant Examiner—Matthew J. Bussan
Attorney, Agent, or Firm—Robert F. Cody

[57] ABSTRACT

A yoke-type magneto-resistive head employs a thin magnetic film structure to bridge a gap in the flux conducting structure of the head and thereby sense magnetic flux. The invention provided means for reducing the magnetic reluctance of the interface between the magnetic film structures and the flux conducting structure of the head, to improve the coupling of magnetic flux from the flux conducting structure to the magnetic film structure and thereby increase the sensitivity of the magneto-resistive head.

9 Claims, 1 Drawing Sheet

FERRITE FILM INSULATING LAYER IN A YOKE-TYPE MAGNETO-RESISTIVE HEAD

BACKGROUND OF THE INVENTION

1. Field of the Invention

This invention relates in general to magnetic flux sensing apparatus and, in particular, to a magnetic head of the type employing a thin magnetic film structure as a magneto-resistive element responsive to the flux being sensed.

2. Background of the Invention

The use of a thin single domain magneto-resistive film in magnetic heads for field sensing purposes is known. Typically, an electrical sense current (either AC or DC) is passed through the magneto-resistive film while the film is exposed to a magnetic field. The magnetic field exerts a torque on the magnetic moment of the magneto-resistive film causing the resistance of the film to increase or decrease depending on the sense and magnitude of the field applied to the film. The resistance of the film is, therefore, the analog of the field strength.

One general type of thin-film magneto-resistive head known within the prior art is a yoke-type magnetic head, examples of which can be found in U.S. Pats. Nos. 4,150,408, 4,425,593 and 4,489,357. A yoke-type magnetic head is composed of a magnetically permeable yoke (typically NiFe) having two flux conducting limbs between which a transducer gap is formed. One of the limbs (limb #1) of the magnetically permeable yoke is interrupted by a space that is bridged by a magneto-resistive element. The magneto-resistive element must, of course, be electrically insulated from the magnetic as well as from electrically conductive parts of the yoke structure. The electrical insulation may be provided by a layer of silicon dioxide ($SiO_2$).

It will be appreciated that in order to maximize the sensitivity of the yoke-type magnetic head, it is necessary to optimize the coupling of the magnetic flux from the flux conducting limb (limb #1) of the permeable yoke to the magneto-resistive element and back to such limb of the yoke. The coupling of signal flux can be increased by reducing the thickness of the $SiO_2$ layer that electrically insulates the magneto-resistive element from flux conducting limb #1. Reducing the insulating layer, however, increases the possibility of an electrical short circuit between the magneto-resistive element and the flux conducting limb #1 of the permeable yoke. Electrical noise in the output signal of the magneto-resistive element also increases as the insulating layer becomes thinner.

The insulating layer, while being a necessary element of the yoke-type head, unfortunately acts as a "flux barrier"—due to the high magnetic reluctance of the interface between the magneto-resistive element and the flux conducting limb #1—that prevents the yoke type head from achieving maximum sensitivity.

SUMMARY OF THE INVENTION

The present invention recognizes that if a means were provided for maintaining the thickness of the insulating layer while at the same time reducing the magnetic reluctance of the interface between the magneto-resistive element and the flux-conducting limb of the permeable yoke, then the flux barrier would be removed without sacrificing the quality of the output signal of the magneto-resistive element. In a presently preferred embodiment, the invention provides for an electrical insulating layer between the magneto-resistive element and the flux-conducting limb that is also magnetically conductive.

With the above as background reference should now be made to the following figures and the accompanying detailed description of the invention wherein:

FIG. 1 is a diagram of a prior art thin film yoke type magneto-resistive head, and FIG. 2 is a diagram of a thin film yoke-type magneto-resistive head incorporating the present invention.

DETAILED DESCRIPTION

Figure 1:
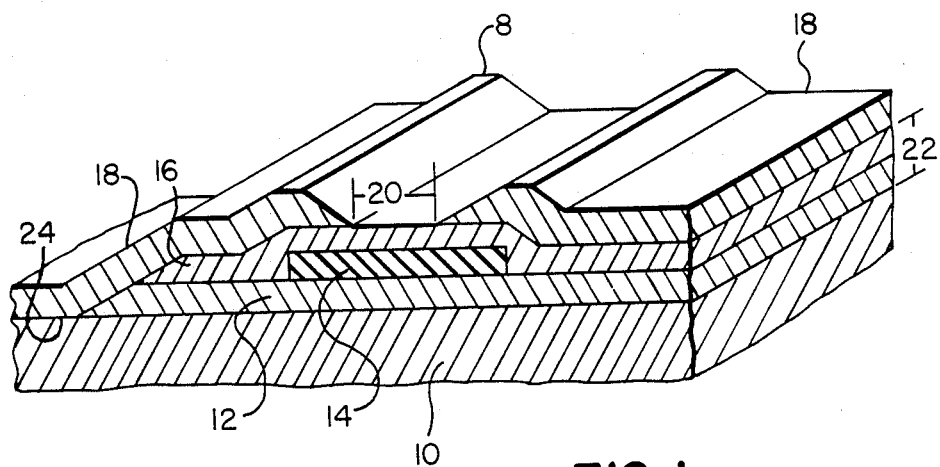

Referring to FIG. 1, a typical prior art yoke-type magneto-resistive head 8 is shown having a ferrite substrate 10 that acts as one flux conducting limb of the magnetic yoke, a first electrically non-conductive layer 12 consisting of $SiO_2$, a thin film magneto-resistive layer 14, a second insulation layer 16 consisting of $SiO_2$ and a thin film magnetically permeable layer of material 18 having a flux sensing space 20. The layer of permeable material 18 forms the second limb of the magnetic yoke. Electrical connections are provided to connect the magneto-resistive layer 14 to a current source (the electrical connections and current source are not shown in FIG. 1).

The separation of one end of the permeable layer 18 from the ferrite substrate 10 by the $SiO_2$ insulating layers 12 and 16 forms a transducer gap 22, and the other end of the layer 18 contacts the surface of the ferrite substrate 10 at a point 24, thereby providing a magnetic short circuit from the permeable layer 18 to the ferrite substrate 10. Signal flux that enters the permeable layer 18 from the transducer gap 22 is, therefore, encouraged to traverse the magneto-resistive layer 14 as the flux completes its loop via the ferrite substrate 10.

The electrically non-conductive layer 16 provided at the interface between the magneto-resistive layer 14 and the permeable layer 18 is not a magnetic conductor and inhibits the coupling of the signal flux from the permeable layer 18 to the magneto-resistive layer 14, reducing the sensitivity of the head.

Figure 2:
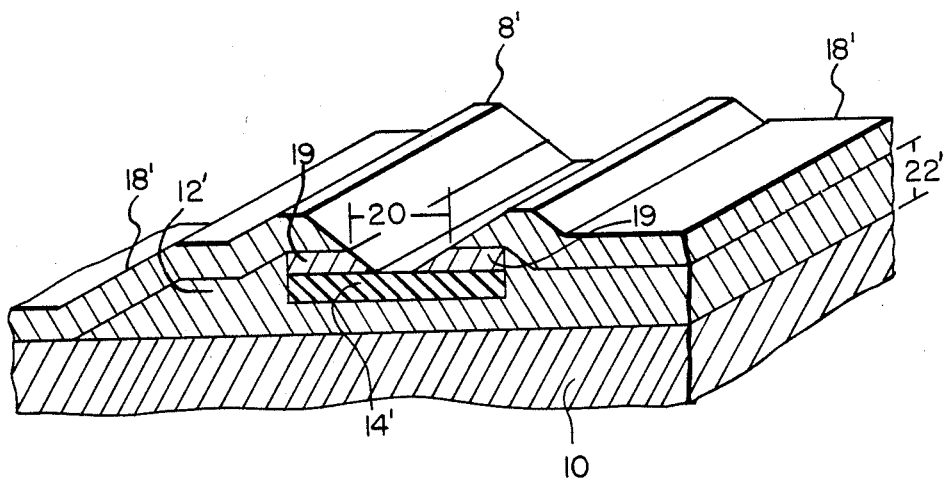

Referring now to FIG. 2, a thin film yoke-type magneto-resistive head 8' ( . . . as employed herein, primed notations have been employed to indicate corresponding parts in the various drawings . . . ) according to the invention is shown. The $SiO_2$ layer 16 (shown in FIG. 1) is replaced by a layer of material 19 that is magnetically conductive (having relative high magnetic permeability), yet electrically non-conductive. The magnetically conductive layer 19 is deposited at the interface of the magneto-resistive layer 14' and the permeable layer 18'. An example of such a material useful for the layer 19 is a ferrite film such as maghemite ($Fe_3O_4$) that may be deposited as a thin film using the techniques disclosed in U.S. Pat. No. 4,477,319 the contents of which are hereby incorporated by reference.

The magnetically conductive layer 19 allows the coupling of signal flux from the layer 18' to the layer 14' with little reluctance while at the same time permitting proper spacing to be maintained betwen the magneto-resistive layer 14' and the permeable layer 18'.

The invention has been described in detail with particular reference to preferred embodiments thereof, but it will be understood that variations and modifications can be effected within the spirit and scope of the invention.

What is claimed is:

1. A magneto-resistive head comprising:
   a. a magnetic substrate
   b. a magnetically permeable layer deposited on said substrate, one end of said permeable layer being spaced from said substrate to form therewith a transducer gap, the other end of said permeable layer having good magnetic conductivity into said substrate, said permeable layer being discontinuous so as to form between parts thereof a flux sensing space,
   c. a magneto-resistive element disposed across said flux sensing space of said permeable layer, and
   d. an interposed layer in direct contact with and lying between said magneto-resistive element and said permeable layer, said interposed layer being a magnetic conductor having relatively high magnetic permeability and an electrical insulator.

2. The magneto-resistive head of claim 1 wherein said interposed layer is comprised of a ferrite film.

3. The magneto-resistive head of claim 2 wherein said ferrite film is $Fe_3O_4$.

4. A magneto-resistive head comprising:
   a. a magnetic substrate,
   b. a first insulating layer formed on said substrate.
   c. a thin film magneto-resistive element deposited on said first insulating layer,
   d. a multipurpose layer deposited on said magneto-resistive element, said multipurpose layer being a magnetic conductor having relatively high magnetic permeability and an electrical insulator, and
   e. a discontinuous permeable member deposited over said multipurpose layer, said permeable member being spaced from said substrate at one end to form a transducer gap and the other end of said permeable layer having good magnetic conductivity into said substrate.

5. The magneto-resistive head as claimed in claim 4 wherein said second insulating layer is comprised of a ferrite film.

6. The magneto-resistive head of claim 5 wherein said ferrite film is $Fe_3O_4$.

7. In a yoke-type magneto-resistive head having a transducer gap, a flux sensing space remote from said transducer gap and a thin magneto-resistive film disposed across said flux sensing space, the improvement comprising an electrically non-conductive layer that is a magnetic conductor having relatively high magnetic permeability in direct contact with and lying between the magneto-resistive film and the yoke structure of the magneto-resistive head to reduce the magnetic reluctance between the head and the magneto-resistive film.

8. The magneto-resistive head of claim 7 wherein said electrically non-conductive layer is comprised of a ferrite film.

9. The magneto-resistive head as claimed in claim 8 wherein said ferrite film is $Fe_3O_4$.

* * * * *